June 4, 1940.   C. W. SHAW   2,202,928
SELF-LOCKING ADJUSTING SCREW
Filed July 2, 1938
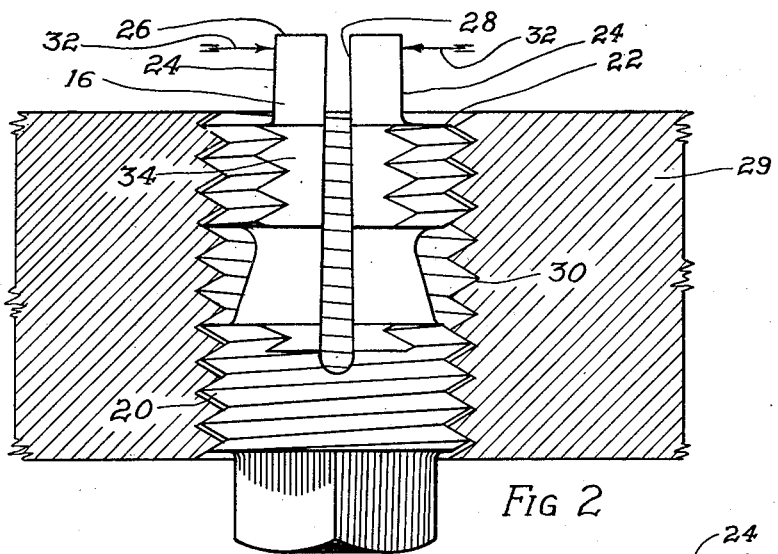
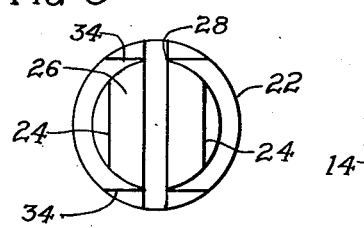
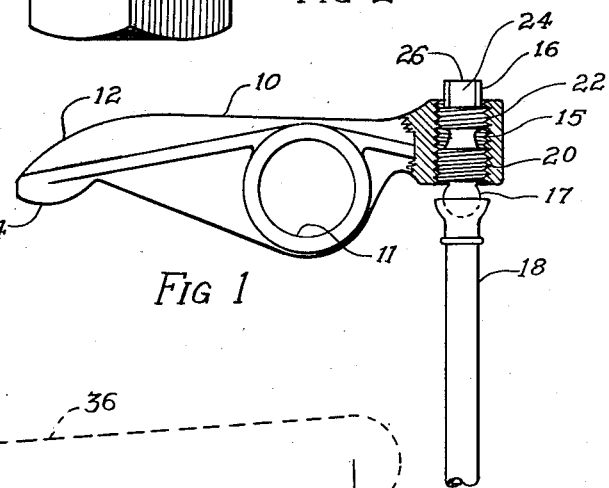
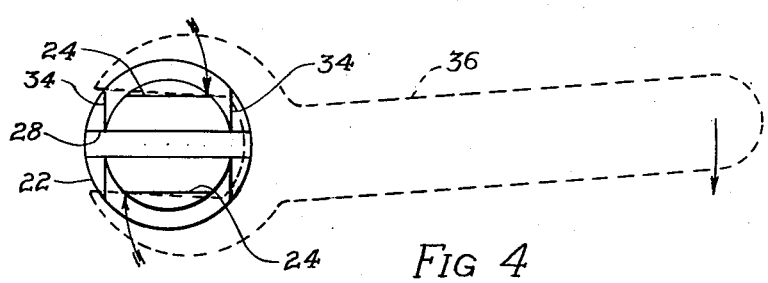
INVENTOR
CLARENCE W. SHAW
John F. Stark
ATTORNEY

Patented June 4, 1940

2,202,928

UNITED STATES PATENT OFFICE 2,202,928

SELF-LOCKING ADJUSTING SCREW

Clarence W. Shaw, Grosse Pointe, Mich., assignor to Eaton Manufacturing Company, Cleveland, Ohio, a corporation of Ohio Application July 2, 1938, Serial No. 217,115

2 Claims. (Cl. 151—22)

This invention relates to self-locking connections and more particularly concerns an improved screw of this type having a friction relieving means incorporated therein.

In order to obtain a more complete understanding of certain of the salient objects, advantages and features of the present invention reference may be had to U. S. Patent 2,166,686 issued to Joseph H. Hoern July 18, 1939, which relates to a self-locking screw construction adapted for utilization in substantially the same manner as the screw of the present invention. In the construction shown in this patent there is provided a self-locking screw having two axially spaced integrally interconnected threaded sections, one of the sections having the lead of the threads thereon axially offset with respect to the lead of the thread of the other section and having the second section resiliently but integrally connected to the first section in order to tension the threads when both sections are threaded into an aperture having a uniform continuous lead.

The present invention is designed as an improvement over the structure disclosed in said patent referred to above and is designed to provide a friction relieving means as an integral part of the screw which renders the screw considerably more acceptable from a commercial standpoint and substantially broadens the field and useful scope thereof.

The improved screw of the present invention comprises a polygonal head portion integrally formed on a substantially cylindrical shank, or preferably, as in this application, by a spherical head portion or, optionally a recessed hemispherical seating portion in lieu thereof. The shank of the screw is externally threaded and has a portion thereof axially spaced from the end of the shank formed of reduced diameter. This reduced diameter portion is preferably substantially frusto-conical in shape. In addition, the screw is provided with an axially extending diametrically disposed slot extending from the axial end of the screw throughout the length of the threaded end section. Further the slotted end of the shank axially beyond the slotted threaded section is produced to a portion of reduced diameter with flats formed thereon constituting a tool engaging portion. This construction provides portions interconnecting the main portion of the shank with the segmental portions constituting the spaced threaded section thereof of scientifically designed spring section, thus virtually eliminating the possibility of fracture during use, and in addition provides a slotted tool engaging portion adapted to be engaged by a spanner that upon rotation in either direction tends to partially collapse the adjacent threaded section thus substantially reducing the wrench torque required to change the adjustment of the screw.

The screw is manufactured by threading in such a manner that the lead of the thread of one section is axially offset with respect to the lead of the other section, although each series of threads have the same pitch. A suitable rolling die for such operation forms the subject matter of Joseph H. Hoern's co-pending application filed August 18, 1937, Serial No. 159,737. After completion of this threading operation, a pair of diametrically opposed faces of the slotted threaded section is relieved by flats formed thereon to permit inward radial movement in a direction parallel to the slot. The axial extension below this threaded portion is then provided with a pair of flats for a tool engaging portion, the flats being formed on a plane transverse to the plane of the aforementioned relieved threaded section. This cutting away of the threads serves to permit relative inward radial movement in a direction parallel to the slot obviating excessive binding of the threads at this point, and provides a means for contraction or partial collapse of the slotted threaded section.

After the screw has been threaded and portions of the shank flatted the slot forming the resilient spring connection between the two threaded sections is then cut from the lower end of the screw axially through the lower threaded section, the reduced shank portion and partially into the upper threaded section.

When the screw has been heat-treated to harden the same, it may be screwed into the internally threaded opening of a valve rockerarm, or other member with which it is associated. As the threads of the main portion of the shank engage the threads of the aperture, a partial collapse radially of the slotted threaded section will result due to the axial offset of the threads on the main portion and the threads on the slotted portion. The amount which these portions of the slotted threaded section are urged radially inward toward each other will be dependent upon the magnitude of the axial offset of the threads of this section with respect to the threads of the other section, and will be resiliently resisted by the spring section serving to interconnect the two threaded sections of the screw and consequently, will very greatly resist the turning movements of the screw within the aperture. Therefore, it will be appreciated that the resistance of the screw to turning movement may be accurately controlled by not only regulating the magnitude of the offset of these threads but also by regulating the thickness and structure of the spring section which serves to interconnect the threaded sections and by increasing or reducing the depth of the slot.

It is a primary object of the present invention to provide a self-locking screw having two axially spaced integrally interconnected threaded sections, one of the sections with the lead of the thread thereon displaced axially with respect to the other threaded section and having a pair of flats formed on the periphery thereof, and said last mentioned section having a tool engaging portion on the axial end, said tool engaging portion and said section being slotted axially in order to provide a friction relief incidental to the application of a torque applying tool thereto.

Many other objects, advantages, and features of the present invention will become apparent when considered in conjunction with the following specification and the drawing forming a part thereof.

In the drawing wherein like numerals indicate similar parts in the several views:

Fig. 1 is a side elevational view with parts in section of a conventional rockerarm and push-rod construction embodying one of the improved locking screws of the present invention;

Fig. 2 is a vertical section through a female threaded member embodying a slightly modified form of lock screw Fig. 3 is an end view of the screw illustrating in detail the configuration of the slotted and flatted lower threaded section of the screw Fig. 4 is a view similar to Fig. 3 illustrating in dotted lines a torque spanner applying a friction relieving function incidental to an adjusting operation on the screw of the present invention.

With more particular reference to the drawing it will be readily understood that the improved locking screws illustrated, provide a construction for threadably interconnecting a pair of members which may find wide and practical utility in many different fields, especially where the head of the screw forms a work engaging member or is not readily accessible to effect an adjustment thereby. However it will be apparent that the improved threaded connections illustrated in the drawing and described below are primarily adapted for use in connection with adjusting screws in valve rockerarms. In Fig. 1 a valve rockerarm 10 of substantially conventional construction is disclosed. This valve rockerarm comprises a lever member 12 that oscillates about an axis 11 and has an end portion 14 for contacting the end of a valve stem (not shown) as is conventional in constructions of this character. The other end of the lever terminates in a circular boss having a threaded aperture 15. This aperture 15 is adapted to receive an adjusting screw 16 which is provided with a generally spherical head portion 17 formed to provide a bearing for the upper end of a push rod 18 which in turn is actuated by a valve tappet receiving periodic impulses from a camshaft (not shown) all of which is conventional. The shank of the screw has the peripheral surface thereof relieved to provide two spaced co-axially disposed sections 20 and 22 which sections are of the same diameter. The portion of the screw interconnecting the threaded sections is of frusto-conical form having a maximum diameter adjacent threaded section 20 and a minimum diameter adjacent threaded section 22. Integrally connected to the axial outer end of the screw is a portion of reduced diameter having a pair of flats 24 formed thereon comprising a tool engaging section 26, the provision of which replaces the conventional slot for effecting adjustable rotation and the function of which is new and novel in this construction as will be hereinafter disclosed. The screw is provided with an axially extending diametrically disposed slot 28 as best shown in Figs. 2 and 3, which extends from the tool engaging axial end of the screw throughout the entire length of the adjacent threaded section 22 and throughout the entire length of the screw shank interconnecting the threaded sections thereof, thereby dividing this section into two separate portions. Consequently, due to the frusto-conical form of the portion interconnecting the sections, it will be seen that these portions of the screw are connected with the main portion of the screw shank by structures comprising spring sections.

The two sections 20 and 22 are each provided on their exterior peripheral surfaces with a series of threads of the same pitch. These threads may be formed in any suitable manner for example by a conventional screw machine, or as previously mentioned by the split thread rolling die forming the subject matter of another application of the same assignees as applicant's application, the prime requisite being that the lead of the thread of one section is axially offset with respect to the lead of the thread of the other section. The magnitude of this offset being an important factor in the determination of the torsional resistance of the screw to turning movement when the same has been threaded in an internally threaded aperture.

In the disclosure of Fig. 2 there is shown an enlarged sectional view through a portion of a threaded member which may be the threaded aperture 15 of the rockerarm in Fig. 1, or, for example, a portion of a clutch pedal adjusting means, or a section of a brake rockshaft adjusting means. In other words the structure of the present invention is applicable to practically any form of threadably interconnected members in order to establish a definite locking relation and prevent unscrewing of one of the members with respect to the other except under predetermined torque loads, or to provide self-locking stop means for positioning one member in predetermined adjustment with respect to another member, even though the construction as a whole is subjected to abnormal shocks and stresses during use. It will be appreciated that as the screw shown in Fig. 2 is threaded into the aperture 30 of the member 29 as soon as the threads on the section 22 start to enter the internally threaded bore 30 the portions of the screw comprising the slotted section will inherently be compressed toward each other radially as the result of the axial offset of the threads on this section and the threads on the main body section 20, and as previously mentioned the degree of collapse of this slotted section 22 will be a function of the magnitude of axial displacement of the lead of one thread section with that of the other. Consequently, the resistance of the screw to turning movement may be accurately regulated by not only regulating the magnitude of the offset of these threads but also by regulating the thickness and structure of the spring section which serves to interconnect one of the threaded sections with the other. Obviously this spring section may be varied by increasing or reducing the size of the slot 28 formed in the axial end of the screw, or by controlling the size and shape of the generally frusto-conical portion of screw shank which interconnects the threaded sections.

As the threads of the section 20 enter the internally threaded bore 30, or the bore 15 in the structure of Fig. 1, the portions of the threaded section 22 will tend to be moved radially inward as the result of the riding-up of the threads of this section on the threads of the internally threaded bore due to the axial offset of the lead of the thread of one section with respect to the lead of the thread of the other section. The slot 28 will permit radial movement, as shown by the arrows 32, in Fig. 2, and the convergence produced in the slot, of these generally semi-cylindrical portions of the trailing screw section in one direction but virtually no relative inward radial movement will be permitted in a direction parallel to the slot 28. Therefore, in order to prevent excessive binding of the threads at this point, it is necessary to relieve the sides of this section 22 to provide flatted surfaces 34 substantially perpendicular to the slot 28. These flattened surfaces serve to permit a relief for the contraction or partial collapse of the slotted threaded section 22 without binding upon the threads of the internally threaded bore 30 of member 29.

In certain instances, for example in radial aircraft engines, the safety factor required to effect torsional displacement of the rockerarm screw, once it is properly adjusted, is relatively high, and while the materials forming these parts are adequately designed for maximum impacts they are necessarily made of the minimum cross section and as light as possible. In the example cited it is not always practical or conveniently accessible to apply an adjusting tool having a sufficient lever arm to effect the desired torsional movement of the screw without effecting serious misalignment of other adjacent and cooperating parts in a reciprocating apparatus of this character. Consequently, it will be readily seen that a locking connection incorporating the requisite torsional resistance to displacement and having a means in conjunction with the adjusting means for effecting a substantial reduction of the torsional resistance, is highly desirable and forms the primary feature of this invention.

As shown in Figs. 1 and 2 the shank of the screw is produced beyond the slotted threaded section 22 to provide a slotted tool engaging portion 26 having flats 24 formed thereon as by milling or other suitable machine operation. It will be apparent now that if a spanner 36 is applied across the two flats 24, as shown in Fig. 4, and a clockwise torsional force is applied to it, as shown by the direction of the arrow on the handle of the spanner, the screw will likewise move in a clockwise direction resisted only by the axial offset of the lead of the thread of the sections 20 and 22, the size and depth of the slot, and the shape of the spring section interconnecting the threaded sections as previously mentioned. However, due to the integral slotted tool engaging portion 26 imparting the torsional movement to the screw, by reason of the spanner applied thereto, it will be apparent that the encompassing sides of the spanner acting on the adjacent flats 24 will tend to partially collapse the slotted portion thereof and hence cause a radially inward movement of the adjacent threaded section 22 in a direction transverse to the slot 28. And as previously mentioned the relieved portions 34 on the slotted threaded section will afford relief for substantially the remaining portion of the periphery of this threaded section in a direction parallel to the slot 28. Therefore, the partial collapse of the slotted portions that is effected simultaneously with the displacement of the screw from its initial position substantially reduces the aforementioned imposed frictional resistances and permits the trailing threaded section to readily move into the threaded aperture. Conversely, when the screw is to be removed from a member as by a counter-clockwise force applied to the spanner the flats 24 are caused to partially collapse by the application of the force on opposite edges thereof, as will be apparent from Fig. 4, by reversing the direction of the arrows and the points of application of the force to the flats.

To clearly illustrate the torque differential required to cause movement of the screw, an adjusting spanner may be applied to the polygonal head of the screw in Fig. 2 and the inch-pounds of torque measured to cause displacement of the screw, then by applying the spanner to the axially opposite end of the screw, as across the flats 24 of the tool engaging portion 26, the inch-pounds of torque also measured to cause displacement of the screw. It has been found there is a torque differential of fifty percent less on the slotted end of the screw as there is on the integral head end. It has also been determined that by regulating the width of the flats 24 an accurate control may be obtained to provide a predetermined torque differential to effect displacement of the screw over the torsional resistance of the screw to movement. That is to say, the screw may be provided with a definite torsional resistance to movement in the operative condition of the screw and then by properly regulating the size of the tool engaging flats a predetermined torque differential may be had to effect a ready movement of the screw when a spanner is applied thereto.

From the foregoing disclosure it will be apparent that a meritorious improvement has been disclosed over the conventional self-locking screw and that many uses will be readily seen for a threaded connection of this type whereby any predetermined torsional resistance of the connection to movement may be readily or automatically reduced by the application of a torque applying tool for easy displacement of the connecting means.

Obviously formal changes may be made in the specific embodiment of the invention described without departing from the spirit or substance of the broad invention, the scope of which is commensurate with the appended claims.

What I claim is:

1. A self-locking screw having a substantially cylindrical externally threaded shank, a pair of projections integrally formed on said shank and axially extending therefrom, the intermediate portions of the surfaces of said projections having threads thereon of substantially the same pitch diameter as the threads on said shank but having the lead thereof offset axially from the lead of the thread on said shank, the threads on said portions being axially spaced from the threads on said shank, and opposite faces of the outer axial end of said projections being relieved to provide tool-engaging portions, said tool-engaging portions being adapted to partially collapse said projections incidental to the application of torque applying tool thereto.

2. In a frictionally locked screw, having inwardly yielding portions adapted to be compressed radially inward to relieve the friction, tool receiving members on the compressible portions of the screw, said tool receiving members having means for compressing said yielding portions incidental to the application of a torque applying tool thereto.

CLARENCE W. SHAW.